United States Patent [19]

Bauer

[11] 3,915,146

[45] Oct. 28, 1975

[54] GRILLING APPARATUS WITH SUPPORT STAND

[75] Inventor: Hans Bauer, Dettingen, Germany

[73] Assignee: Dietz-Druckguss KG, Unterensingen, Germany

[22] Filed: May 31, 1974

[21] Appl. No.: 474,920

[30] Foreign Application Priority Data

June 2, 1973 Germany............................ 207633

[52] U.S. Cl............................. 126/41 R; 126/25 R
[51] Int. Cl.² ..................... A47J 37/00; F24C 3/00
[58] Field of Search ..... 126/41 R, 25 R, 9 R, 275 R

[56] References Cited

UNITED STATES PATENTS

| | | | |
|---|---|---|---|
| 1,879,880 | 9/1932 | Lindsey | 126/9 R |
| 3,638,635 | 2/1972 | Drenhan | 126/41 R |
| 3,692,013 | 9/1972 | Grafton et al | 126/41 R |
| 3,763,846 | 10/1973 | Schantz | 126/25 R |
| 3,771,510 | 11/1973 | Short | 126/41 R |
| 3,789,822 | 2/1974 | Schantz | 126/41 R |

Primary Examiner—Edward G. Favors

[57] ABSTRACT

Grilling apparatus with a support stand and with a grill tub which houses a heating arrangement in the form of an infrared gas radiator, which is supplied with gas from a bottle. The tub and heating arrangement are mounted on a support stand which at the same time serves as a housing for the bottle so that the bottle is protectively stored and does not interfere with the use of the grilling apparatus. The support stand may be walled in, the housing being provided with an opening. Alternatively, the housing arrangement may be made out of two housing halves, the separating plane of which extends parallel to the forefront of the grilling apparatus, the front halve of the housing being fastened, hinges to the back half of the housing. This separating plane can be extended through the mounted grill tub, so that the walls of the support frame form a one-piece housing with the walls of the grill tub.

4 Claims, 3 Drawing Figures

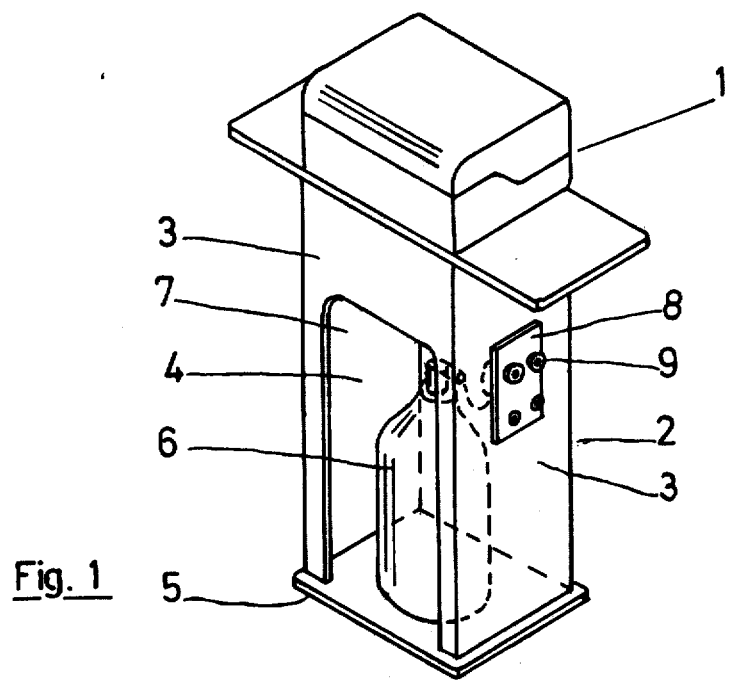
Fig. 1
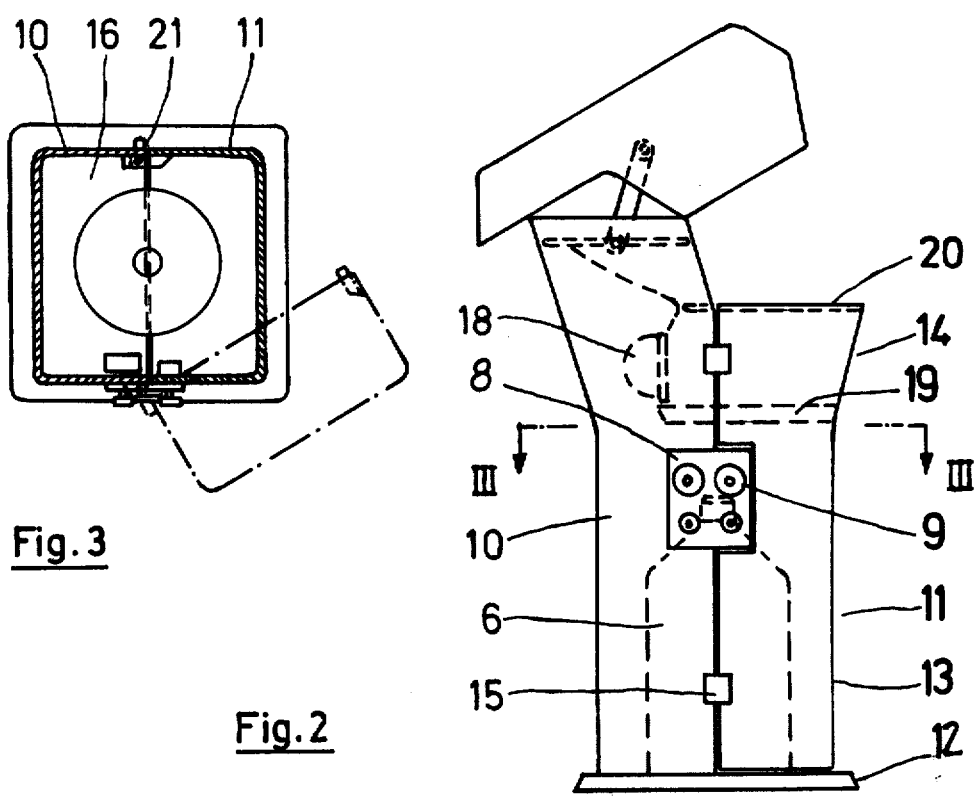
Fig. 3
Fig. 2

GRILLING APPARATUS WITH SUPPORT STAND

This invention relates to a grilling apparatus with a support stand and with a grill tub or enclosure which houses a heating arrangement. Such grilling devices serve to grill foods of all kinds, such as steaks, sausages, toasted bread, chicken and the like. The grilling apparatus of the invention is provided with an infrared gas radiator, and is supplied with gas from a bottle.

In known grilling devices, the grill tub is mounted on a pipelike support or pipe stand, the bottle sits under the grill tub either next to the support or between the legs of the pipe stand. The gas is led to the gas radiator through a connecting hose. This arrangement is unsatisfactory, because the free-standing bottle with its connecting valves can easily be fouled, or becomes wet in humid weather or during rain. It is also undesirable that the gas supply can be surreptitiously handled, for instance, by children, which leads to an unnecessary loss of gas from the bottle. The bottle in standing next to the pipes is also an obstacle when the grilling device is being used.

It is an object of the invention to build a support stand which at the same time serves as a housing for the bottle, so that the bottle is protectively stored and does not interfere with the use of the grilling apparatus.

This object is accomplished, according to the invention, by mounting the grill tub on an enclosed support stand which has an inner space provided with an opening.

The bottle can thereby be brought into the inner space of the support and stand through the opening and is thereby protected from the weather and tampering.

In a preferred embodiment the housing arrangement is made out of two housing halves, the separating plane of which extends parallel to the forefront of the grilling apparatus, the front half of the housing being fastened swingingly by hinges to the back half of the housing. This separating plane can be extended through the mounted grill tub, so that the walls of the support frame with the walls of the grill tub form a one-piece housing.

The back half of the housing is provided with a footplate and stands securely on the ground, the front half of the housing can be swung up, so that the inner space of the support frame not only serves to replace and hold the bottle, but also makes possible to clean the inner space of the grill tub or to exchange the gas radiator.

Between the front and back halves of the housing there can be affixed a locking device, so that after locking, unauthorized access to the bottle can be prevented.

Furthermore, on one of the side walls, there can be provided a hinge-plate with a pressure regulator for feeding the gas to the burner, so that the burner-heat can be adjusted in a convenient manner.

According to this construction of the grilling apparatus having two complementary housing halves, these housing halves can in a very simple way be manufactured as aluminum castings. This manufacturing procedure is very economical and also guarantees a high protection against corrosion of the grilling apparatus due to the aluminum.

Examples of method construction of the invention are illustrated in the accompanying drawings in which:

FIG. 1 is a view in perspective of a first embodiment of grilling apparatus in accordance with the invention with a one-piece support frame;

FIG. 2 is a side view of a second embodiment of a grilling device in accordance with the invention with two housing halves; and FIG. 3 is a view in cross-section through the grilling apparatus along the line III—III in FIG. 2, the front housing being shown closed in full lines, and the front housing being shown open in dash lines.

In the example of the method of construction according to FIG. 1, the grill tub 1 is made separate from the support frame 2, and is mounted on top of the frame when in use. The support frame 2 consists of a quandragular housing with walls 3 which enclose an inner space 4. The inner space 4 is closed at its lower end by a bottom or floor plate 5, which supports the bottle 6 which holds the gas. On the back wall 7 there is an opening, which is large enough so that the bottle 6 can easily be moved into the inner space 4.

On a side wall 3 there is a control panel 8, on which valves such as that shown at 9 are affixed for turning the gas supply on and off for regulating the rate of feeding of the burner (not shown) which is mounted in a known way in the grilling device 1.

In a second embodiment in accordance with the invention, illustrated in FIGS. 2 and 3, the grilling device consists of a back housing half 10 and a front housing half 11. The back housing half 10 is provided at its lower end with a floor plate 12, the housing half 10 forming part of the support frame 13 as well as the grill tub 14. The front housing half 11 is so affixed by hinges 15 on the back housing, that it can be swung open to expose the inner space 16.

A gas supply bottle 6 is disposed in this inner space, bottle 6 being connected via the valves 9 with the burner 18.

A dripping dish 19 and a grill plate 20 are securely connected to the front housing half 11, so that when swinging open the front half housing, the dripping dish 19 as well as the burner 18 are easily accessible.

On a side wall of the back housing half 10 there is a closure 21 by which the back housing half 10 and the front housing half 11 can be closed and locked together.

The control panel 8 supporting the valves 9 is securely connected to one of the side walls of the back housing half 10 and the valves 9 are affixed on the outside of the control panel 8, so that again the gas flow as well as the gas pressure can easily be regulated even when the front housing halve is closed.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a gas grilling apparatus operable from a portable gas container, the apparatus comprising a grill assembly having a gas burner, a grill basin and a grill disposed in operative association, and means for coupling the portable gas container to the gas burner of the grill assembly, the improvement wherein the apparatus further comprises a completely hollow housing having an upper portion for supporting the grill assembly, the hollow interior of the housing being bounded by at least four walls for receiving the portable gas container, and means defining an opening in at least one of the walls of the housing for providing external communication with the hollow interior of the housing.

2. Grilling apparatus according to claim 1, wherein the housing is formed by two housing halves and comprising means for connecting the housing halves together in such a way that one of the housing halves can be removed from the other housing half.

3. Grilling apparatus according to claim 2, wherein the separating plane between the two housing halves runs parallel to the front of the grilling apparatus, and the front half of the housing is fastened to the back half of the housing by hinges so that it is swingable thereon.

4. Grilling apparatus according to claim 2, comprising a lock between the housing halves so that the housing halves when in closed condition can be locked together.

* * * * *